(12) United States Patent
Uchida et al.

(10) Patent No.: US 12,170,746 B2
(45) Date of Patent: Dec. 17, 2024

(54) IMAGE READING APPARATUS HAVING IMAGE READING UNIT SUPPORTED BY A SUPPORT SHAFT AND BEING CONNECTED TO CABLES DISPOSED ON OPPOSITE SIDES OF THE SUPPORT SHAFT AND IMAGE FORMING SYSTEM INCLUDING THE IMAGE READING APPARATUS

(71) Applicant: CANON KABUSHIKI KAISHA, Tokyo (JP)

(72) Inventors: Masaki Uchida, Tokyo (JP); Teppei Nagata, Chiba (JP); Tomohito Nakagawa, Chiba (JP); Yukihiro Soeta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/538,236

(22) Filed: Dec. 13, 2023

(65) Prior Publication Data

US 2024/0205343 A1      Jun. 20, 2024

(30) Foreign Application Priority Data

Dec. 20, 2022   (JP) ................................ 2022-203553

(51) Int. Cl.
*H04N 1/00*    (2006.01)
*H04N 1/031*   (2006.01)
*H04N 1/10*    (2006.01)
*H04N 1/12*    (2006.01)
(Continued)

(52) U.S. Cl.
CPC ..... *H04N 1/00557* (2013.01); *H04N 1/00015* (2013.01); *H04N 1/00034* (2013.01);
(Continued)

(58) Field of Classification Search
CPC .......... H04N 1/00013; H04N 1/00015; H04N 1/00018; H04N 1/00023; H04N 1/00034;
(Continued)

(56) References Cited

U.S. PATENT DOCUMENTS 7,869,102 B2 *   1/2011   Ohara .................. H04N 1/1017
                                                          358/461
8,081,354 B2 *  12/2011   Okada .................. H04N 1/1013
                                                          358/475
(Continued)

FOREIGN PATENT DOCUMENTS

JP        2021190991 A      12/2021

*Primary Examiner* — Scott A Rogers
(74) *Attorney, Agent, or Firm* — ROSSI, KIMMS & McDOWELL LLP

(57) ABSTRACT

An image reading apparatus includes a conveyance unit, a casing, a reading unit, a support shaft, a first cable, and a second cable. The reading unit includes a reading sensor configured to read an image of the sheet conveyed in the conveyance path through the transparent member. The support shaft supports the reading unit in a manner of moving in a moving direction orthogonal to a longitudinal direction of the reading unit. The first cable is connected to a first connecting portion disposed in the reading unit, the first cable being held by the reading unit on one side in the longitudinal direction with respect to the support shaft. The second cable is connected to a second connecting portion disposed in the reading unit, the second cable being held by the reading unit on the other side in the longitudinal direction with respect to the support shaft.

10 Claims, 14 Drawing Sheets

(51) Int. Cl.
H04N 1/407 (2006.01)
(52) U.S. Cl.
CPC ..... H04N 1/00045 (2013.01); H04N 1/00068 (2013.01); H04N 1/00082 (2013.01); H04N 1/00559 (2013.01); H04N 1/00602 (2013.01); H04N 1/00615 (2013.01); H04N 1/00795 (2013.01); H04N 1/0318 (2013.01); H04N 1/1026 (2013.01); H04N 1/1043 (2013.01); H04N 1/123 (2013.01); H04N 1/1235 (2013.01); H04N 1/4076 (2013.01)
(58) Field of Classification Search
CPC .. H04N 1/00045; H04N 1/603; H04N 1/6033; H04N 1/6036; H04N 1/6044; H04N 1/00557; H04N 1/00559; H04N 1/00615; H04N 1/00795; H04N 1/1026; H04N 1/1039; H04N 1/1043
See application file for complete search history.

(56) References Cited

U.S. PATENT DOCUMENTS

| | | | | |
|---|---|---|---|---|
| 8,300,279 | B2* | 10/2012 | Mukai | H04N 1/103 |
| | | | | 327/365 |
| 8,625,179 | B2* | 1/2014 | Sakatani | H04N 1/00034 |
| | | | | 358/504 |
| 9,100,625 | B2* | 8/2015 | Iguchi | G06K 15/1868 |
| 9,332,143 | B2* | 5/2016 | Tamai | H04N 1/00559 |
| 9,402,007 | B2* | 7/2016 | Ninomiya | H04N 1/00522 |
| 9,413,909 | B2* | 8/2016 | Kim | H04N 1/00557 |
| 10,057,441 | B2* | 8/2018 | Iguchi | H04N 1/00559 |
| 10,097,734 | B2* | 10/2018 | Sakatani | G06K 15/027 |
| 10,136,009 | B2* | 11/2018 | Yamauchi | H04N 1/1026 |
| 11,412,093 | B2* | 8/2022 | Izawa | H04N 1/00068 |
| 11,949,820 | B2* | 4/2024 | Genda | G06T 7/001 |
| 2021/0377406 | A1* | 12/2021 | Nakagawa | G03G 15/5062 |

* cited by examiner

FIG.5

| PAPER SHEET NAME | SUB-SCANNING DIRECTION SHEET LENGTH (mm) | MAIN SCANNING DIRECTION SHEET LENGTH (mm) | GRAMMAGE (g/m²) | SURFACE PROPERTY | COLOR |
|---|---|---|---|---|---|
| ABC PAPER-MANUFACTURING COMPANY RECYCLE 1 | 210 | 297 | 75 | REGULAR PAPER | WHITE |
| ABC PAPER-MANUFACTURING COMPANY RECYCLE 2 | 297 | 420 | 75 | REGULAR PAPER | WHITE |
| DEF PAPER-MANUFACTURING COMPANY EMBOSSED PAPER A-1 | 216 | 279 | 150 | EMBOSS | WHITE |
| DEF PAPER-MANUFACTURING COMPANY COATED PAPER P-1 | 279 | 432 | 128 | BOTH-SURFACE COATED | WHITE |
| | 210 | 297 | 75 | REGULAR PAPER | ORANGE |
| XYZ PAPER-MANUFACTURING COMPANY COLOR 82 | 210 | 297 | 75 | REGULAR PAPER | PINK |

810
811
812

1001

ADD NEW | EDIT | DELETE | PRINTING POSITION ADJUSTMENT

| | PAPER SHEET NAME | SUB-SCANNING DIRECTION SHEET LENGTH (mm) | MAIN SCANNING DIRECTION SHEET LENGTH (mm) | GRAMMAGE (g/m²) | SURFACE PROPERTY | COLOR | PREPRINTED PAPER | GEOMETRIC ADJUSTMENT VALUE (FRONT SURFACE) | GEOMETRIC ADJUSTMENT VALUE (BACK SURFACE) | READING GAP AMOUNT |
|---|---|---|---|---|---|---|---|---|---|---|
| 810 | ABC PAPER MANUFACTURING COMPANY RECYCLE 1 | 210 | 297 | 75 | REGULAR PAPER | WHITE | No | A1: 0.3mm<br>A2: -0.1mm<br>A3: +0.02%<br>A4: +0.01% | A1: 0.2mm<br>A2: 0.1mm<br>A3: +0.02%<br>A4: -0.03% | G1 |
| 811 | ABC PAPER MANUFACTURING COMPANY RECYCLE 2 | 297 | 420 | 75 | REGULAR PAPER | WHITE | No | A1: 0.0mm<br>A2: -0.0mm<br>A3: +0.00%<br>A4: +0.00% | A1: 0.0mm<br>A2: -0.0mm<br>A3: +0.00%<br>A4: -0.00% | G1 |
| 812 | DEF PAPER MANUFACTURING COMPANY EMBOSSED PAPER A-1 | 216 | 279 | 150 | EMBOSS | WHITE | No | A1: 0.5mm<br>A2: -0.5mm<br>A3: +0.02%<br>A4: +0.02% | A1: -0.3mm<br>A2: 0.5mm<br>A3: +0.01%<br>A4: -0.03% | G3 |
| | DEF PAPER MANUFACTURING COMPANY COATED PAPER P-1 | 279 | 432 | 128 | BOTH-SURFACE COATED | WHITE | No | A1: 0.4mm<br>A2: 0.2mm<br>A3: +0.12%<br>A4: +0.08% | A1: -0.2mm<br>A2: 0.6mm<br>A3: +0.02%<br>A4: -0.01% | G2 |
| | XYZ PAPER MANUFACTURING COMPANY COLOR 81 | 210 | 297 | 75 | REGULAR PAPER | ORANGE | No | A1: 0.0mm<br>A2: -0.0mm<br>A3: +0.00%<br>A4: +0.00% | A1: 0.0mm<br>A2: -0.0mm<br>A3: +0.00%<br>A4: +0.00% | G1 |
| | XYZ PAPER MANUFACTURING COMPANY COLOR 82 | 210 | 297 | 75 | REGULAR PAPER | PINK | No | A1: 0.0mm<br>A2: -0.0mm<br>A3: +0.00%<br>A4: +0.00% | A1: 0.0mm<br>A2: -0.0mm<br>A3: +0.00%<br>A4: +0.00% | G1 |
| | FGH PAPER MANUFACTURING COMPANY GRID SHEET 75 | 210 | 297 | 75 | REGULAR PAPER | WHITE | Yes | A1: 0.0mm<br>A2: -0.0mm<br>A3: +0.00%<br>A4: +0.00% | A1: 0.0mm<br>A2: -0.0mm<br>A3: +0.00%<br>A4: +0.00% | G1 |
| | FGH PAPER MANUFACTURING COMPANY REGULAR PAPER 2 | 210 | 297 | 75 | REGULAR PAPER | WHITE | Yes | A1: 0.0mm<br>A2: -0.0mm<br>A3: +0.00%<br>A4: +0.00% | A1: 0.0mm<br>A2: -0.0mm<br>A3: +0.00%<br>A4: +0.00% | G1 |

ND IMAGE FORMING SYSTEM INCLUDING
IMAGE READING APPARATUS HAVING IMAGE READING UNIT SUPPORTED BY A SUPPORT SHAFT AND BEING CONNECTED TO CABLES DISPOSED ON OPPOSITE SIDES OF THE SUPPORT SHAFT AND IMAGE FORMING SYSTEM INCLUDING THE IMAGE READING APPARATUS

BACKGROUND OF THE INVENTION

Field of the Invention

This disclosure relates to an image reading apparatus reading an image of a sheet, and an image forming system to which this image reading apparatus is applied.

Description of the Related Art

Hitherto, image reading apparatuses reading an image of a sheet by reading sensors through transparent members while conveying the sheet are known. Further, generally, so as to correct light amount variations of light sources of the reading sensors in a main scanning direction, and sensitivity variations of light receiving units in the main scanning direction, shading correction is performed by reading a white reference board using the reading sensors. As the shading correction described above, for example, configurations in which the shading correction is performed by moving carriages, mounting contact image sensors (CISs), on sliding shafts further upstream than reading positions in slide shaft directions are known (refer to Japanese Patent Laid-Open No. 2021-190991). In these configurations, the CISs include the reading sensors.

However, cables for communication are connected to the reading sensors, and these cables are, for example, disposed on one side in the main scanning direction with respect to the sliding shafts. Therefore, when the carriages move, loads from the cables act on the carriages, and sometimes the carriages are inclined (refer to FIG. 14). Therefore, there is a possibility that the carriages mounting the reading sensors are inclined when the carriages move, and, consequently, reading accuracy is decreased.

SUMMARY OF THE INVENTION

The purpose of this disclosure is to provide an image reading apparatus and an image forming system that can suppress a decrease in the reading accuracy of a reading sensor.

According to a first aspect of the present invention, an image reading apparatus includes a conveyance unit configured to convey a sheet along a conveyance path, a casing including a transparent member that is configured to form a part of the conveyance path, a reading unit including a reading sensor configured to read an image of the sheet conveyed in the conveyance path through the transparent member, and accommodated in the casing, a support shaft configured to support the reading unit in a manner of moving in a moving direction orthogonal to a longitudinal direction of the reading unit, a first cable connected to a first connecting portion disposed in the reading unit, the first cable being held by the reading unit on one side in the longitudinal direction with respect to the support shaft, and a second cable connected to a second connecting portion disposed in the reading unit, the second cable being held by the reading unit on the other side in the longitudinal direction with respect to the support shaft.

According to a second aspect of the present invention, an image forming system includes an image forming apparatus including an image forming unit configured to form an image on a sheet, and an image reading apparatus configured to read the image of the sheet on which the image has been formed in the image forming unit. The image reading apparatus includes a conveyance unit including an inlet roller configured to receive the sheet from the image forming apparatus and configured to convey the sheet along a conveyance path, a casing including a transparent member that is configured to form a part of the conveyance path, a reading unit including a reading sensor configured to read an image of the sheet conveyed in the conveyance path through the transparent member, and accommodated in the casing, a support shaft configured to support the reading unit in a manner of moving in a moving direction orthogonal to a longitudinal direction of the reading unit, a first cable connected to a first connecting portion disposed in the reading unit, the first cable being held by the reading unit on one side in the longitudinal direction with respect to the support shaft, and a second cable connected to a second connecting portion disposed in the reading unit, the second cable being held by the reading unit on the other side in the longitudinal direction with respect to the support shaft.

Further features of the present invention will become apparent from the following description of exemplary embodiments with reference to the attached drawings.

BRIEF DESCRIPTION OF THE DRAWINGS

FIG. 5 is an explanatory diagram illustrating a paper sheet library screen of the embodiment.

FIG. 7 is an explanatory diagram illustrating the paper sheet library screen of the embodiment.

DESCRIPTION OF THE EMBODIMENTS

Figure 1:
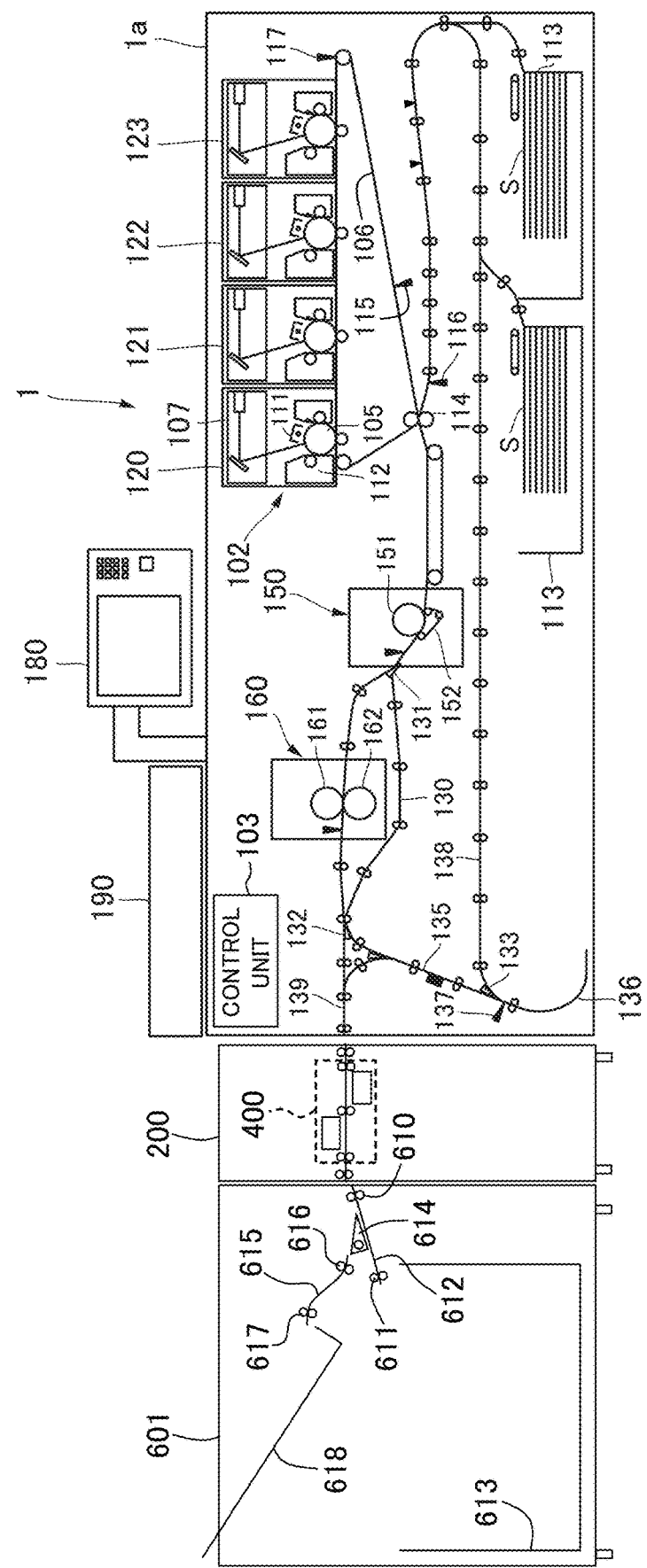
FIG. 1 is a cross-sectional view illustrating an image forming system of an embodiment.

Hereinafter, with reference to FIGS. 1 to 13, an embodiment of this disclosure will be described in detail. First, using FIG. 1, a schematic configuration of an image forming apparatus 1 of the present embodiment will be described. FIG. 1 is a cross-sectional view illustrating an image forming system 100. The image forming system 100 includes the image forming apparatus 1, an operation unit 180, an adjusting and inspecting apparatus 200 (automatic adjusting and inspecting apparatus), and a loading apparatus 601 (post-processing apparatus (finisher)). The image forming apparatus 1 forms an image on a sheet S (recording medium). The operation unit 180 is operated by a user for setting conditions of image formation in the image forming apparatus 1, and displays the conditions of the image forming apparatus 1.

The adjusting and inspecting apparatus 200 performs the registration of the front and back surfaces for measuring a positional shift between images formed on the front and back surfaces of the sheet S, and inspection processing for detecting the presence of a defect in the image formed on the sheet S. While the loading apparatus 601 is an apparatus for discharging the sheet S, on which the image has been formed, to a sheet discharge tray and for loading the sheet S on the sheet discharge tray, as other post-processing apparatuses, it is acceptable to attach apparatuses performing post-processing, such as stapling processing, punching processing, and sorting processing. Further, the image forming system 100 includes a reader 190 that reads an image of a document.

Image Forming Apparatus

The image forming apparatus 1 is a laser beam printer of an electrophotographic system. The image forming apparatus 1 forms the image on the sheet S using an image forming process of the electrophotographic system. To be noted, a full color copier including a plurality of photosensitive drums is applied to the present embodiment. However, it is not limited to this, and it is possible to apply the present embodiment also to a monochrome and mono-color copier and printer. Further, it is not limited to the electrophotographic system, and possible to apply the present embodiment to an ink jet printer, a dye sublimation printer, and a thermal printer of a heat drying system.

Figure 2:
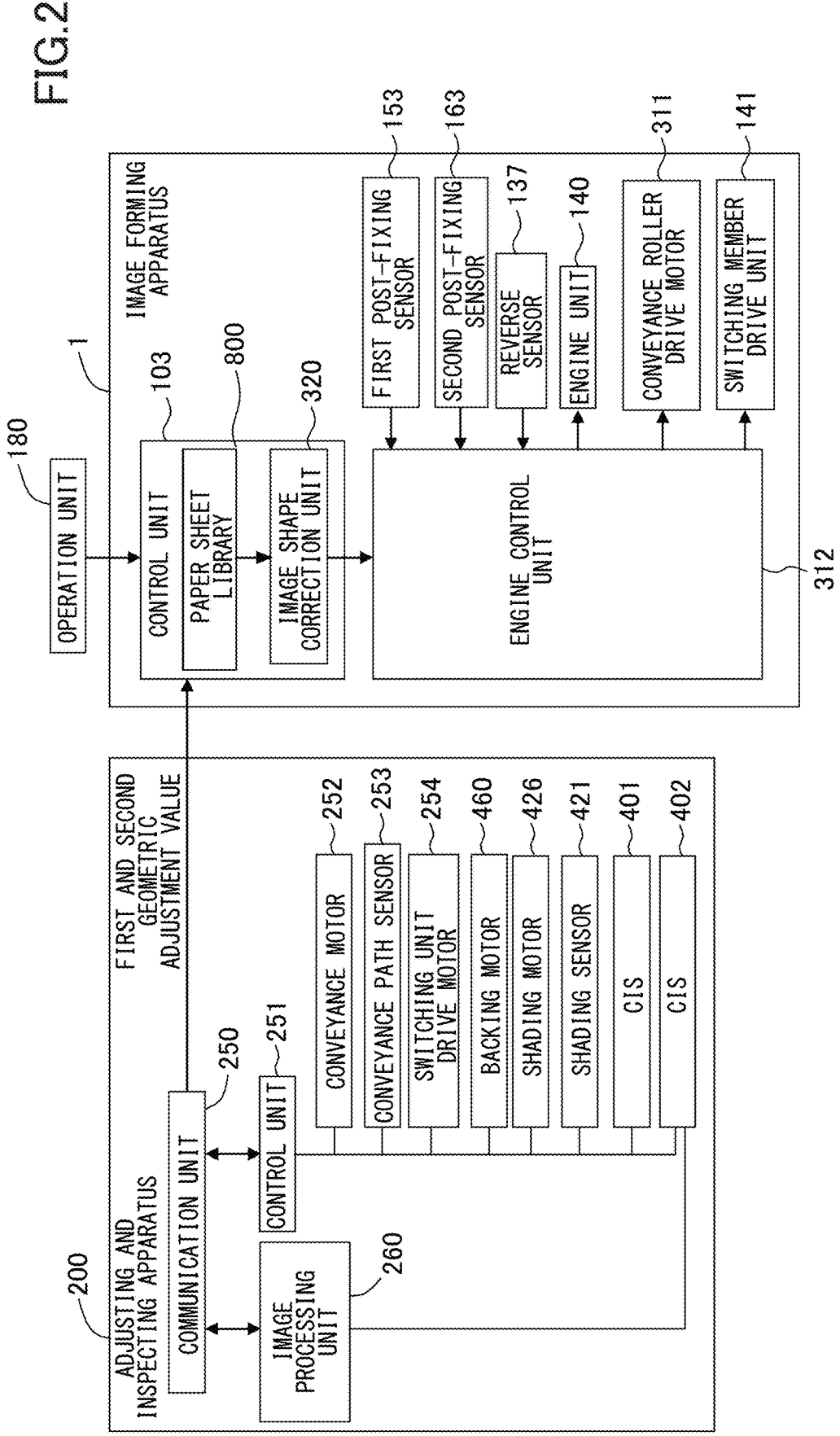
FIG. 2 is a block diagram illustrating control systems of an image forming apparatus and an adjusting and inspecting apparatus of the embodiment.

FIG. 2 is a block diagram illustrating control systems of the image forming apparatus 1 and the adjusting and inspecting apparatus 200. The image forming apparatus 1 includes a control unit 103, an engine control unit 312, and an engine unit 140. The control unit 103 includes a paper sheet library 800 and an image shape correction unit 320. The control unit 103 is electrically connected to the operation unit 180, the engine control unit 312, and a communication unit 250 of the adjusting and inspecting apparatus 200. The control unit 103 includes a central processing unit (CPU), a random access memory (RAM), a read only memory (ROM), and an input/output (I/O), and controls each unit described above incorporated in the image forming system 100.

The engine control unit 312 is electrically connected to a conveyance roller drive motor 311 and a switching member drive unit 141. The switching member drive unit 141 drives switching members 131, 132, 133, and 134. The engine control unit 312 is electrically connected further to first and second post-fixing sensors 153 and 163, a reverse sensor 137, and the engine unit 140. The engine control unit 312 performs the image forming process (including sheet feeding processing) by controlling the engine unit 140. The engine unit 140 includes a station 120 of yellow, a station 121 of magenta, a station 122 of cyan, and a station 123 of black.

The engine unit 140 further includes a sheet cassette 113, an intermediate transfer belt 106, a secondary transfer outer roller 114, and first and second fixing units 150 and 160.

As illustrated in FIG. 1, in the image forming apparatus 1, a sheet S is conveyed from a sheet cassette 113 to an image forming unit 102, and a toner image is formed on the sheet S. The image forming apparatus 1 conveys the sheet S on which the toner image has been formed in the image forming unit 102 to fixing units 150 and 160, and, by applying heat and pressure, fixes an unfixed toner image on the sheet S on the sheet S. As the sheet S, paper such as thin paper and cardboard, a plastic film such as a sheet for an overhead projector (OHP), a surface treated sheet such as coated paper, a specially shaped sheet such as an envelope, and cloth are included.

The image forming unit 102 includes stations 120, 121, 122, and 123, and forms an image on the sheet conveyed by a sheet conveyance unit 10. The image forming apparatus 1 includes an intermediate transfer belt 106 and a secondary transfer outer roller 114. The stations 120, 121, 122, and 123 respectively form toner images of yellow, magenta, cyan, and black on the intermediate transfer belt 106. Configurations of the stations 121, 122, 122, and 123 are standardized except for differences in colors of toners. Therefore, the configuration of the station 120 will be described as an example, and the configurations of the other stations 121, 122, and 123 will be omitted herein.

A photosensitive drum 105, serving as an image bearing member, rotates in a counter-clockwise direction in FIG. 1. A primary charge unit 111 charges a surface of the photosensitive drum 105 to a uniform surface potential. A laser unit 108 includes a light source outputting a laser beam, and forms an electrostatic latent image on the photosensitive drum 105. A developing unit 112 forms the toner image by developing the electrostatic latent image formed on the photosensitive drum 105 by using developer containing toner. The toner images formed by the stations 120, 121, 122, and 123 are transferred onto the intermediate transfer belt 106. The secondary transfer outer roller 114 transfers the toner image on the intermediate transfer belt 106 onto the sheet S conveyed from the sheet cassette 113.

On the other hand, the sheet S fed from the sheet cassette 113 is conveyed to the secondary transfer outer roller 114 via the sheet conveyance unit 10. When the sheet S is brought into pressure contact with the intermediate transfer belt 106 in the secondary transfer outer roller 114, simultaneously, a bias voltage with an opposite characteristic to the toner is applied to the secondary transfer outer roller 114. Thereby, a visible image formed on the intermediate transfer belt 106 is secondarily transferred onto the sheet S that is synchronously conveyed by a sheet feed processing mechanism in a sub-scanning direction. A start position detection sensor 115 for determining a printing start position at a time of image formation, a sheet feed timing sensor 116 for measuring a timing of feeding the sheet S, and a density sensor 117 for measuring patch density during density control are arranged around the intermediate transfer belt 106. When performing the density control, density of each patch is measured by the density sensor 117.

The image forming apparatus 1 includes the first fixing unit 150 and the second fixing unit 160 for fixing the toner image transferred onto the sheet S by the heat and pressure. The first fixing unit 150 includes a fixing roller 151 for applying the heat to the sheet S, a press belt 152 bringing the sheet S into pressure contact with the fixing roller 151, and a post-fixing sensor 153 for detecting the completion of fixing. The fixing roller 151 is a hollow roller, and includes a heater inside. The fixing roller 151 conveys the sheet S by being rotatably driven. The second fixing unit 160 is located further downstream than the first fixing unit 150 in a sheet conveyance direction, and arranged for a purpose of applying gloss or ensuring fixation with respect to the toner image on the sheet S from the first fixing unit 150. Similar to the first fixing unit 150, the second fixing unit 160 includes a fixing roller 161, a press roller 162, and a post-fixing sensor 163.

Depending on a type of the sheet S, there is a case in which it is not necessary to pass through the second fixing unit 160. So as to reduce an energy consumption amount, a conveyance path 130 for discharging the sheet S without passing through the second fixing unit 160 in such a case is included. It is possible to guide the sheet S to the conveyance path 130 by a switching member 131.

A switching member 132 directs the sheet S, which has been conveyed via the image forming unit 102 and the fixing units 150 and 160, either to the outside of the image forming apparatus 1a or to a conveyance path 135. In a case of single sided printing, after having completed the image formation via the image forming unit 102 and the fixing units 150 and 160, the sheet S is guided to a conveyance path 139 by the switching member 132, and discharged outside.

In a case of duplex printing, after the single sided printing has been completed, the sheet S is reversed, and conveyed to the image forming unit 102 again. In particular, the switching member 132 guides the sheet S to a conveyance path 135 after the fixing, and the sheet S is conveyed to a reverse portion 136. When a reverse sensor 137 has detected a trailing edge of the sheet S, a switching member 133 switches a conveyance direction of the sheet S to a conveyance path 138. The sheet S that has been reversed is conveyed to the image forming unit 102 and further to the fixing units 150 and 160 again via the conveyance path 138. The sheet S on which the duplex printing has been completed is guided to the conveyance path 139 by the switching member 132, and discharged outside.

For example, in the duplex printing, so as to print an adjustment chart (measurement test pattern) on a second surface of the sheet S after the adjustment chart has been printed on a first surface of the sheet S, the switching member 132 switches a conveyance destination of the sheet S to the conveyance path 135. The sheet S conveyed to the conveyance path 135 is conveyed to a reverse portion 136. After the trailing edge of the sheet S conveyed to the reverse portion 136 has been detected by the reverse sensor 137, a conveyance direction of the sheet S is reversed. The switching member 133 switches the conveyance destination of the sheet S to the conveyance path 138. Thereby, the front and back sides of the sheet S are reversed. The sheet S is conveyed from the conveyance path 138 to a secondary transfer nip between the intermediate transfer belt 106 and the secondary transfer outer roller 114. In the secondary transfer nip, the adjustment chart is transferred onto the second surface of the sheet S. The sheet on whose both surfaces the adjustment chart has been printed is conveyed from a sheet discharge path 139 to the adjusting and inspecting apparatus 200.

Adjusting And Inspecting Apparatus

Figure 3:
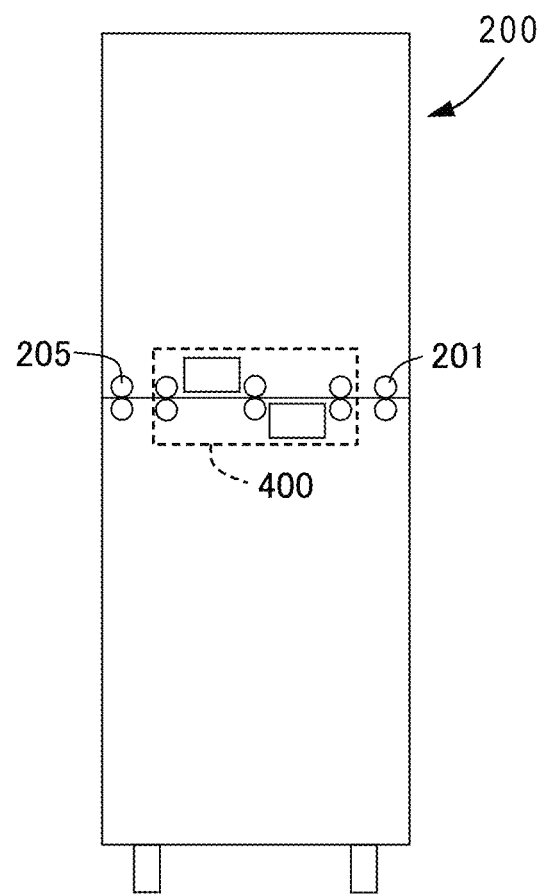
FIG. 3 is a cross-sectional view illustrating the adjusting and inspecting apparatus of the embodiment.

On a downstream side of the image forming apparatus 1 in the sheet conveyance direction, the adjusting and inspecting apparatus 200, illustrated in FIG. 3, which is an example of the image reading apparatus is arranged. The adjusting and inspecting apparatus 200 is arranged downstream of the image forming apparatus 1 in the sheet conveyance direction of the sheet S. FIG. 3 is a cross-sectional view illustrating the adjusting and inspecting apparatus 200. The adjusting and inspecting apparatus 200 includes a first conveyance roller 201 that receives and conveys the sheet S conveyed from an upstream apparatus, an adjusting and inspecting unit 400 that performs an adjustment and inspection by reading the image printed on the sheet S, and a second conveyance roller 205 that conveys the sheet S to a downstream apparatus. The first conveyance roller 201 is an example of an inlet roller that receives the sheet S from the image forming apparatus 1.

Adjusting And Inspecting Unit

Figure 4:
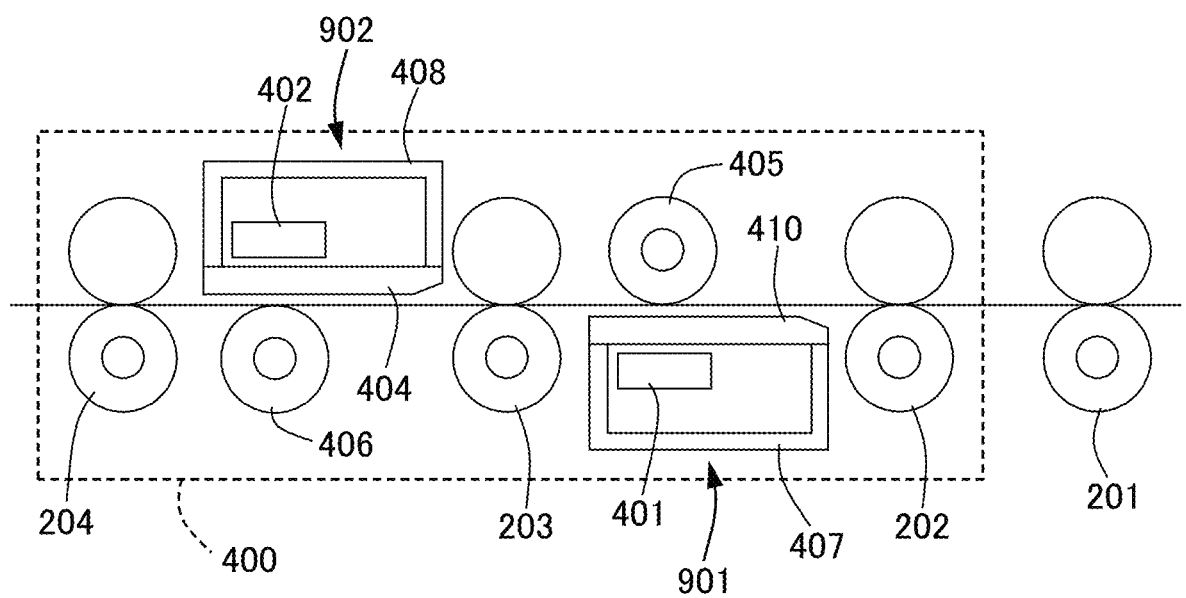
FIG. 4 is a cross-sectional view illustrating an adjusting and inspecting unit of the embodiment.
Figure 6A:
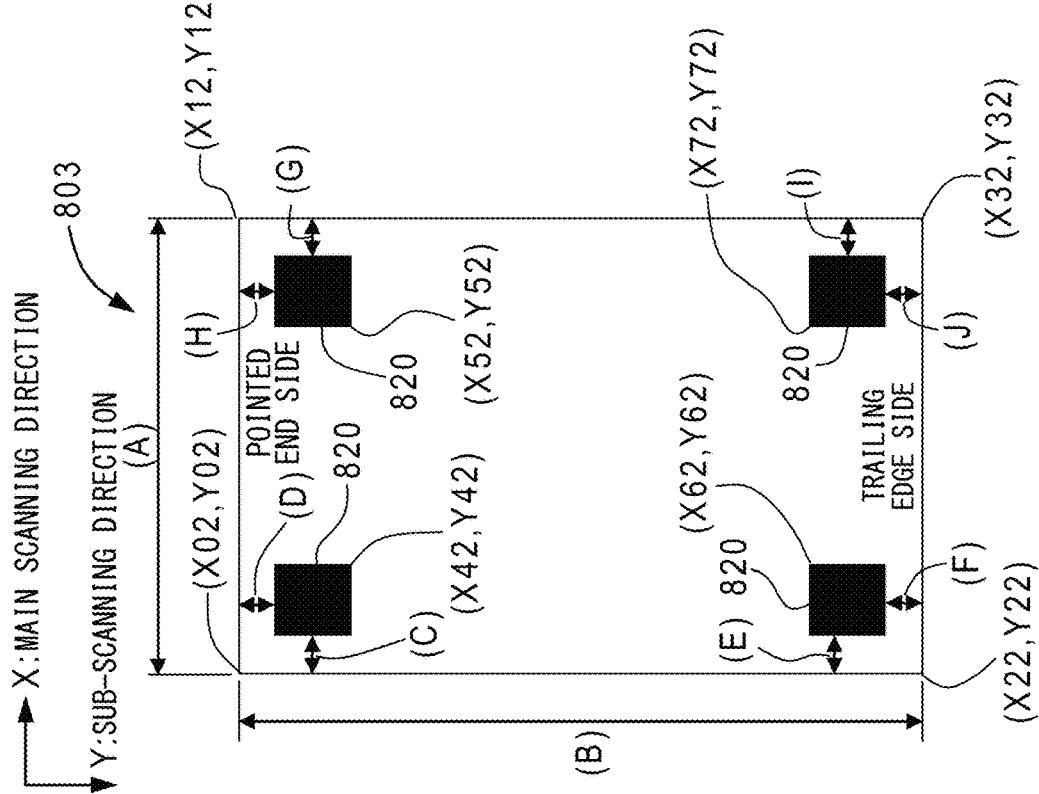
FIG. 6A is a diagram illustrating a front surface test pattern of the embodiment.
Figure 6B:
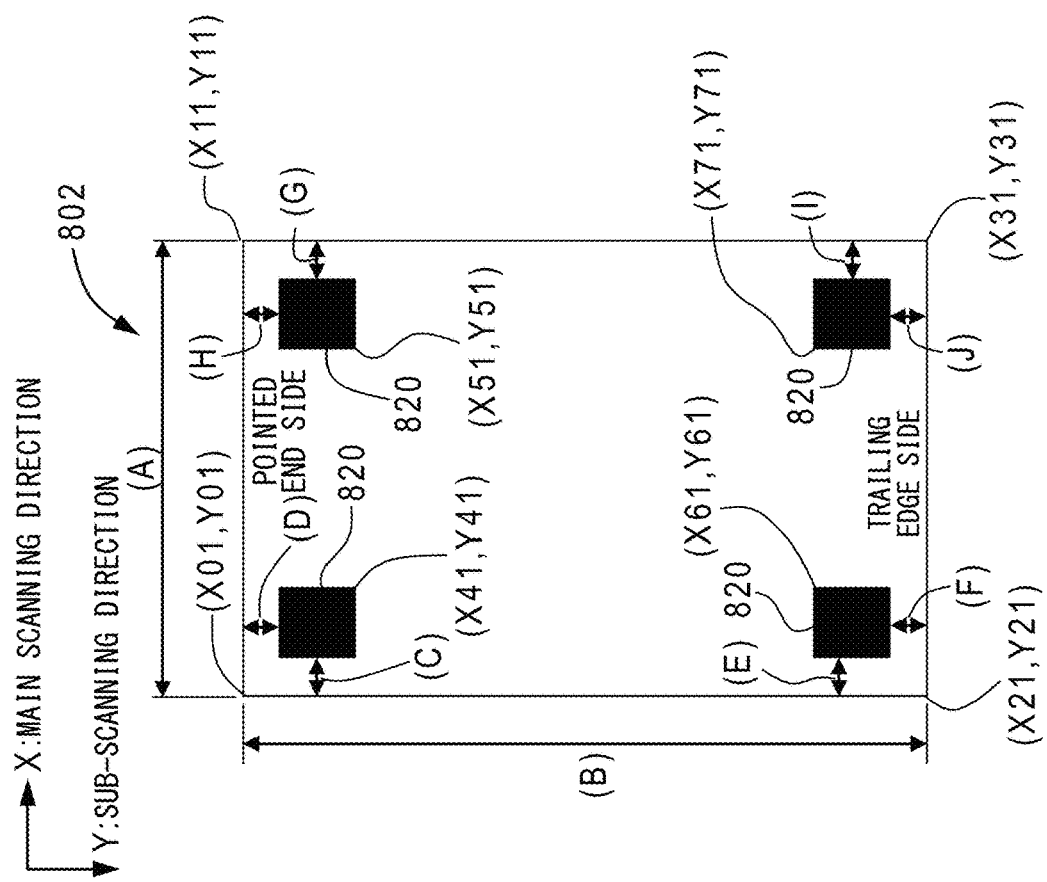
FIG. 6B is a diagram illustrating a back surface test pattern of the embodiment.

Using FIG. 4, a configuration of the adjusting and inspecting unit 400 will be described. The adjusting and inspecting unit 400 is a unit that has functions of measuring a shape of the sheet S and a shape and a positional relationship of an image pattern printed on the sheet S, feeding back a measurement result to the image forming apparatus 1, and detecting an abnormality of image information printed on the sheet S. A contact image sensor (hereinafter, referred to as a CIS) is used as a sensor unit for obtaining the image information.

The adjusting and inspecting unit 400 includes conveyance roller pairs 202, 203, and 204 for performing the reading at a stable conveyance speed. The first conveyance roller 201, the conveyance roller pairs 202, 203, and 204, and the second conveyance roller 205 are conveyance units conveying the sheet. Due to the necessity to almost simultaneously read measurement test patterns formed on the front and back sides of the sheet S, a first surface reading unit 901 and a second surface reading unit 902 are arranged on sides opposite to each other with respect to a sheet path. The first surface reading unit 901 includes a contact image sensor (CIS) 401, a reading glass 410, serving as a conveyance guide member, made from glass for stabilizing a position of the CIS 401 in a focal depth direction, and a casing 407. The CIS 401 that is accommodated in the casing 407 reads the image of the sheet S conveyed in a conveyance path through the reading glass 410. Similarly, the second surface reading portion 902 includes a CIS 402, a reading glass 404, serving as a conveyance guide member, made from glass, and a CIS frame 408. Further, for enhancing a contrast with an edge of the sheet when reading, a black-colored backing roller 405 is arranged in a position facing the first surface reading unit 901, and, similarly, a backing roller 406 is arranged in a position facing the second surface reading unit 902. The backing roller 405 is an example of a facing member that faces the reading glass 410 in a reading position of the CIS 401.

Feedback Configuration of Front-Back Registration

Next, measurement at the registration of the front and back surfaces by the adjusting and inspecting unit 400, and the feedback of a measurement result will be described. FIG. 5 is an example of a paper sheet library screen 1001 displayed on the operation unit 180. When the image forming apparatus 1 has received a request from a printing position adjustment button 1002 in the paper sheet library screen 1001 through an operation of the operation unit 180, the image forming apparatus 1 starts the output of a front surface test pattern 802 and a back surface test pattern 803 (refer to FIG. 6) for the registration of the front and back surfaces. While sending the sheet S, on which the front and back surface test patterns 802 and 803 are formed, by the conveyance roller pairs 202, 203, and 204, the adjusting and inspecting unit 400 continuously reads the test patterns by the CISs 401 and 402, and performs measurement from detected images.

The CIS 401 detects coordinates $(X_{01}, Y_{01})$ to $(X_{31}, Y_{31})$ and $(X_{41}, Y_{41})$ to $(X_{71}, Y_{71})$ of the front surface test pattern 802. The CIS 402 detects coordinates $(X_{02}, Y_{02})$ to $(X_{32}, Y_{32})$ and $(X_{42}, Y_{42})$ to $(X_7, Y_{72})$ of the back surface test pattern 803. Based on these detection results, an image processing unit 260 measures a distortion quantity of the image and a positional shift with respect to the sheet S, and calculates geometric adjustment parameters (such as a lead position, a side position, a magnification, perpendicularity, and a rotation amount). The geometric adjustment values calculated by the image processing unit 260 are transmitted to the paper sheet library 800 in the image forming apparatus 1 through the communication unit 250, and stored in a front surface geometric adjustment amount 804 and a back surface geometric adjustment amount 805 as front surface parameters and back surface parameters (refer to FIG. 7). It is noted that A1 means LEAD POSITION, A2 means SIDE POSITION, A3 means MAIN SCANNING MAGNIFICATION, and A4 means SUB-SCANNING MAGNIFICATION in FIG. 7.

As illustrated in FIG. 7, a paper sheet setting 810 obtained as described above in the paper sheet library 800 is used when executing a print job using the same paper sheet. Thereby, a position and a distortion of the image are corrected, and it becomes possible to output a printed image whose printing positions on the front and back surfaces are corrected with high accuracy. Printing of the front and back surface test patterns 802 and 803 illustrated as examples in the descriptions above, for instance, can be executed as the test output that is performed as a setup prior to the print job. Alternatively, it is acceptable to execute the printing as the test output in a form of the calibration that is automatically inserted at a predetermined timing during the print job.

Inspection Process

Figure 8:
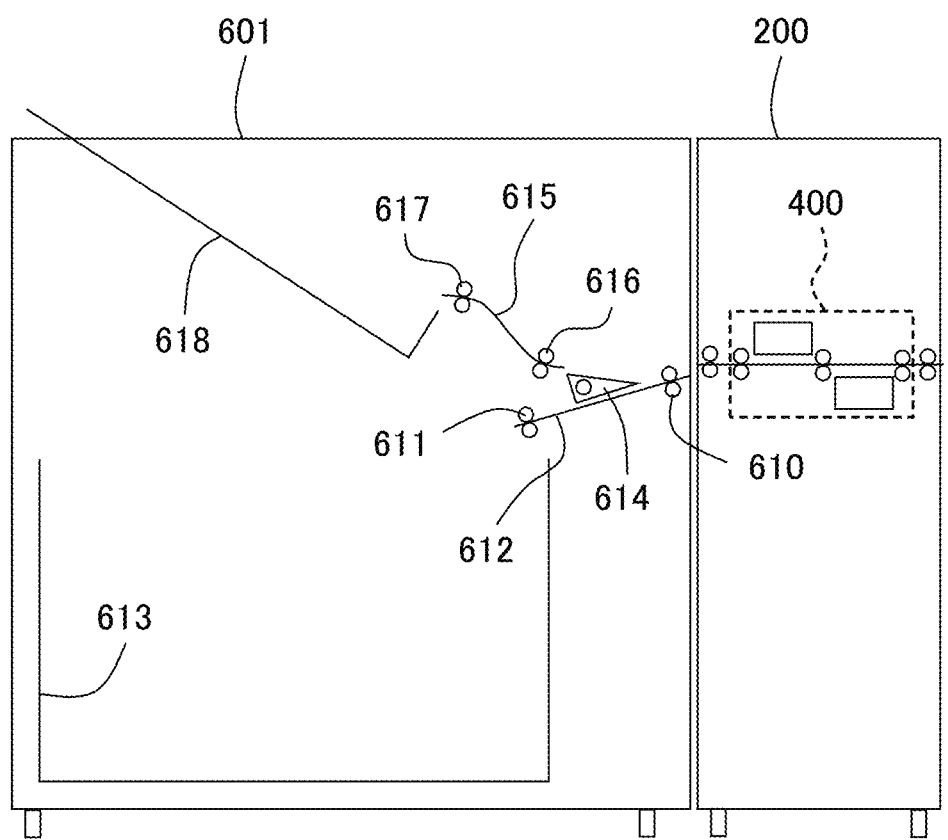
FIG. 8 is a cross-sectional view illustrating a loading apparatus and the adjusting and inspecting apparatus of the embodiment.

A flow of an inspection process by the adjusting and inspecting unit 400 will be described. FIG. 8 is a cross-sectional view illustrating a configuration in which the adjusting and inspecting apparatus 200 is connected to the loading apparatus 601, serving as the post-processing apparatus. During the inspection process, the image that has been read in the adjusting and inspecting unit 400 is transmitted to an external personal computer (PC) as a signal, and is compared with a previously registered image and data, so that it is possible to detect soiling and printing errors. In a case of having performed the inspection process with respect to the conveyed sheet and judged that there are not the printing errors and the image is correct, the sheet is conveyed to a conveyance path 612 by conveyance roller pairs 610 and 611, and loaded on a first loading portion 613. Alternatively, the sheet that has been detected as having the printing errors is switched to a conveyance path 615 by a switching member 614, and loaded on a second loading portion 618 by conveyance roller pairs 616 and 617. Through the flow described above, it becomes possible to automatically perform the sorting and the loading of faulty printed materials. Alternatively, after performing the inspection process by reading the image in the adjusting and inspecting unit 400, it is also possible to load all the printed materials on the first loading portion 613 by retaining only a data log of the printing errors.

Reading Portion

Figure 9:
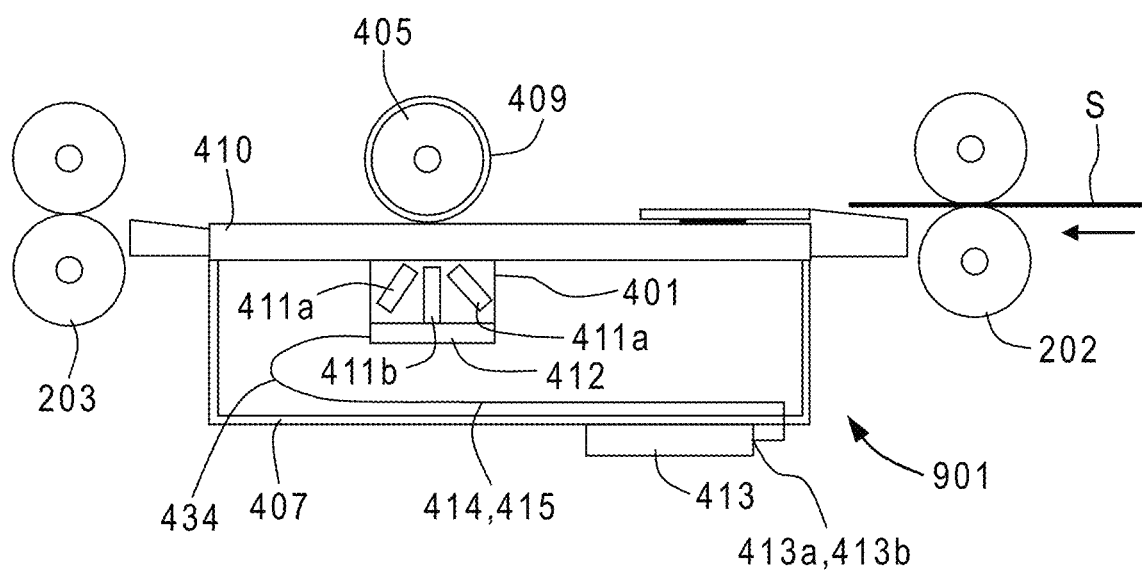
FIG. 9 is a cross-sectional view illustrating a state in which a CIS of a first surface reading unit of the embodiment is located in a reading position.

FIG. 9 illustrates a state in which the sheet is conveyed by the first surface reading unit 901, serving as a reading portion. The sheet S is conveyed from a right side to a left side in FIG. 9. The sheet S is conveyed by the conveyance roller pair 202, and guided to an upper surface of the reading glass 410 that is transparent. The reading glass 410 is a part of the casing 407, and is a transparent member that forms a part of a conveyance path. The sheet S further proceeds, and, after passing through the reading position, is conveyed by the conveyance roller pair 203 on a downstream side. The CIS 401 arranged in the reading position is a well-known so-called contact image sensor. The CIS 401 is an example of the reading unit including a reading sensor that reads the image of the sheet S conveyed in a sub-scanning direction. In the CIS 401, light is emitted toward the sheet S by light emitting portions 411a, each of which includes a light source, and reflected light from the sheet S is collected to light receiving portions 411b on a line by such as a rod lens array. Thereafter, the reflected light that has been collected is photoelectrically converted by the reading sensor, and is output to a sensor substrate 412, so that image data of the sheet S are generated based on an output signal of the reading sensor. To be noted, the reading sensor is connected to the sensor substrate 412, and, here, the sensor substrate 412 is illustrated as the reading sensor. In the present embodiment, a sheet feeding reading method by which the image of the sheet S is read while conveying the sheet S at a constant speed on an area, which is located over the CIS 401 positioned at the reading position, of the reading glass 410 is applied.

In the reading position, the black-colored backing roller 405 is arranged so as to mitigate the fluttering of the sheet S that is being conveyed. The backing roller 405 rotates substantially at the same circumferential speed as the sheet S, and guides the sheet S. So as to enhance the contrast for making it easier to recognize edges of the sheet S in the image that has been read, an outer circumferential surface of the backing roller 405 is colored in black. Gap assurance abutment rollers 409 are arranged at end portions of the backing roller 405 in an axial direction so as to ensure a gap for the sheet S to enter in a manner of coming into contact with the reading glass 410. An amount of the gap is set to the thickness of the sheet S being conveyed with an additional margin included. The margin and the gap are set to ensure that, even if the sheet S flutters, a position of the sheet with respect to the reading glass 410 remains within a readable range.

The CIS 401 is connected with respect to a control substrate 413 secured outside of the casing 407 through a first flexible flat cable 414 (hereinafter, a flexible flat cable is referred to as an FFC) and a second FFC 415. To be noted, in recent years, with the enlargement of the CIS 401 and improvement in a communication speed, two FFCs are needed.

Figure 13:
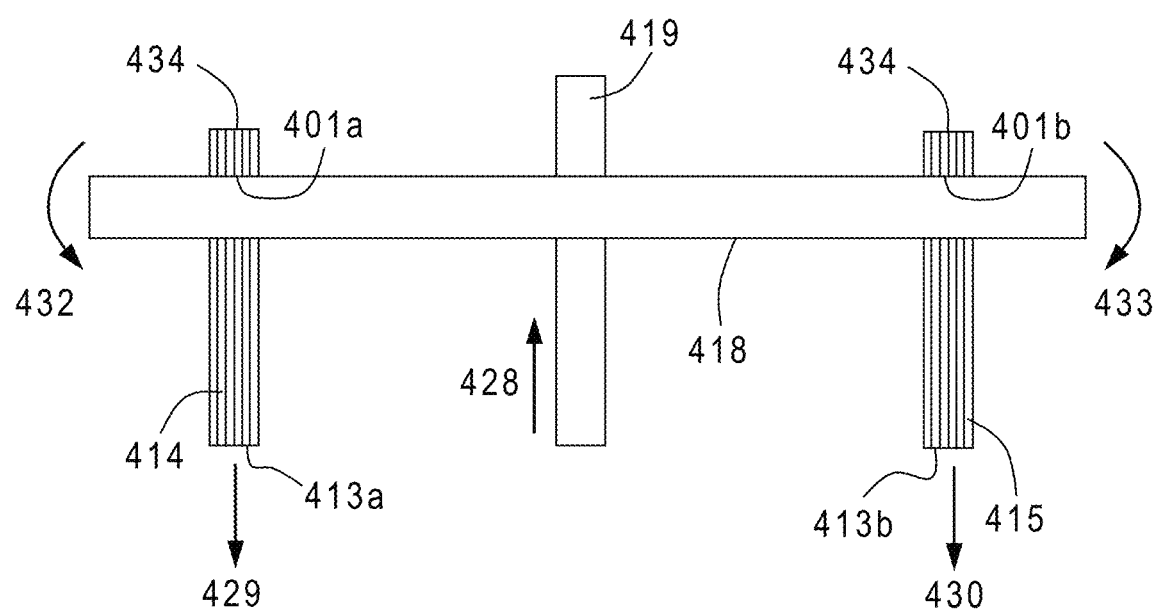
FIG. 13 is a plan view illustrating mounting positions of a first flexible flat cable (FFC) and a second FFC of the embodiment.

In the present embodiment, first ends of the first and second FFCs 414 and 415 are respectively connected to first and second connecting portions 401a and 401b disposed in the CIS 401 (refer to FIG. 13). The first and second connecting portions 401a and 401b are, for example, connectors. The first connecting portion 401a functions as a first holding portion that holds the first FFC 414. The second connecting portion 401b functions as a second holding portion that holds the second FFC 415. Further, second ends of the first and second FFCs 414 and 415 are respectively connected to third and fourth connecting portions 413a and 413b disposed in the control substrate 413 that is secured to the casing 407 (refer to FIG. 13). The third and fourth connecting portions 413a and 413b are, for example, connectors. That is, the first FFC 414 is an example of a first cable, is a cable that electrically connects the first and third connecting portions 401a and 413a, and has flexibility. Further, the second FFC 415 is an example of a second cable, is a cable that electrically connects the second and fourth connecting portions 401b and 413b, and has the flexibility. Electronic equipment for controlling the CIS 401 is mounted onto the control substrate 413. In the present embodiment, an image signal of the sheet S that the CIS 401 has read is transmitted to the control substrate 413 through the first and second FFCs 414 and 415.

Further, in the present embodiment, each of the first and second FFCs 414 and 415 includes a bend portion 434 that is an example of a curve portion which deforms while curving in conjunction with the movement of the CIS 401. The bend portions 434 of the first and second FFCs 414 and 415 are directed in the same direction (refer to FIG. 13). Thereby, first and second rotational moments 432 and 433, described below, are generated in directions to cancel each other.

Figure 10:
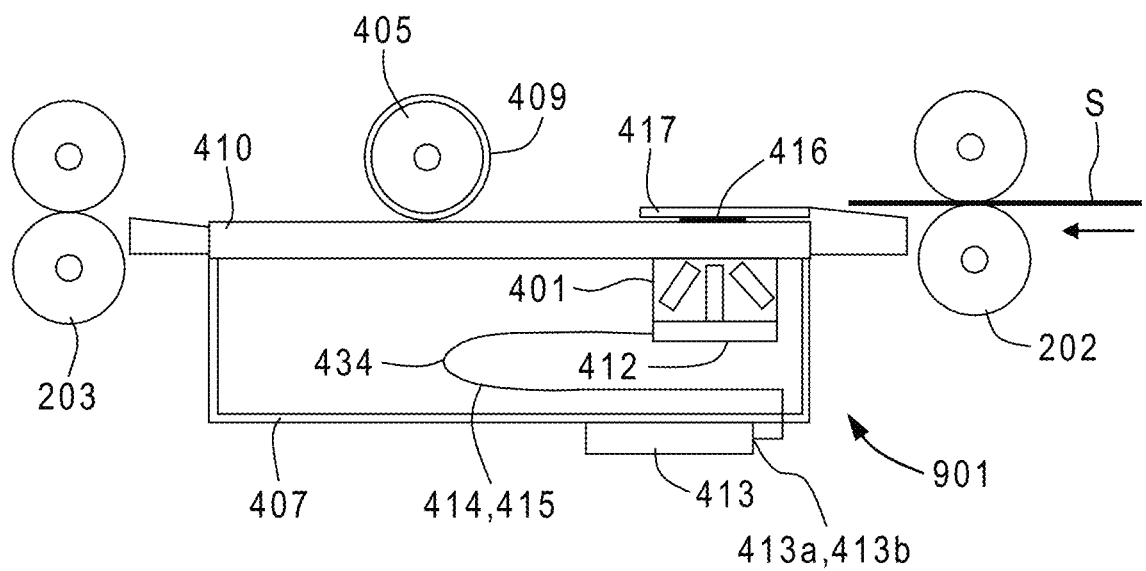
FIG. 10 is a cross-sectional view illustrating a state in which the CIS of the first surface reading unit of the embodiment is located in a shading position.

FIG. 10 is a cross-sectional view illustrating a state in which shading correction is performed in the first surface reading unit 901. So as to perform the shading correction, the CIS 401 moves to a shading position located upstream in the sheet conveyance direction.

Here, the shading correction will be described. Since there are light quantity nonuniformity in the light sources and the rod lens arrays of the CIS 401 and sensitivity unevenness in the light receiving portions 411b, sometimes, it is not possible to perform uniform image reading. Therefore, so as to achieve the uniform image reading, a white reference board 416 with fully managed color tones is placed, and the output values (data) obtained when reading the white reference board by the CIS 401 are used to perform the correction of the image data acquired from the output of the reading sensor with respect to the image of the sheet S. This is the shading correction. Generally, the shading correction is performed after having optimized light emitting amounts of the light sources irradiating the sheet S and having optimized an amplification factor (gain) at the time of amplifying the output of the image signal of the CIS 401. A series of corrections, including adjustments of the light emitting amount and the gain, which are performed for the CIS 401 so as to uniformly read the image of the sheet S are referred to as the shading correction. Further, this white reference board 416 is disposed on a surface of the reading glass 410 by a method of such as printing, coating, adhesion, or pasting using a tape. Further, a sheet guide member 417 is arranged in a manner of covering the white reference board 416. The sheet guide member 417 is disposed in a manner of facing a surface on a side of a conveyance path of the reading glass 410, and guides the sheet to a gap between the backing roller 405 and the reading glass 410. The white reference board 416 is disposed on a side opposite to the conveyance path on the sheet guide member 417.

Scanning Operation of CIS

Figure 11:
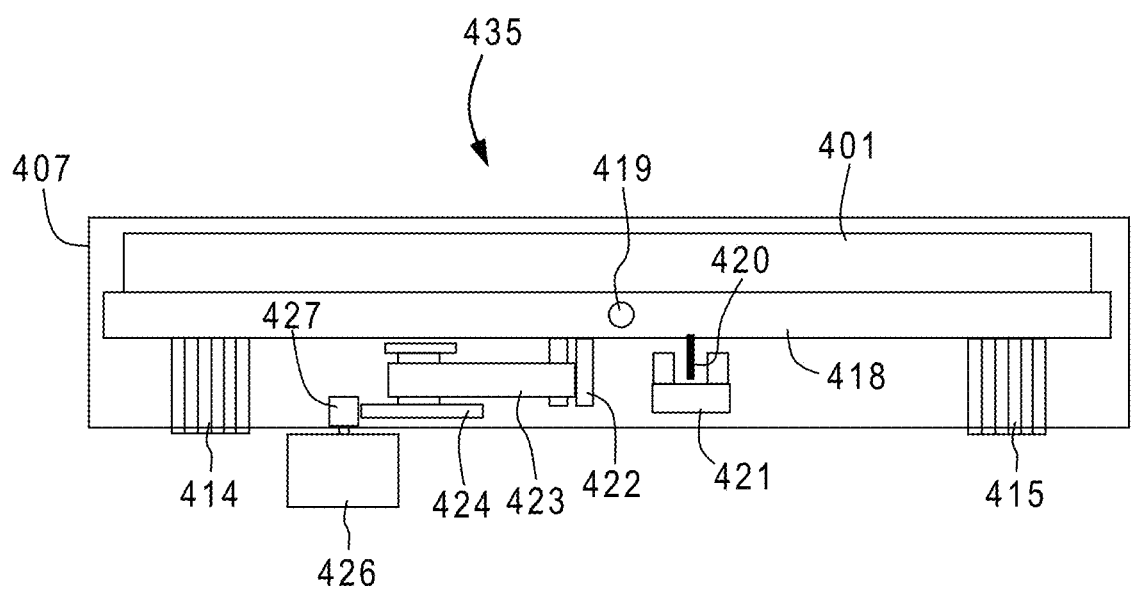
FIG. 11 is a front view illustrating a shading drive unit of the embodiment.
Figure 12:
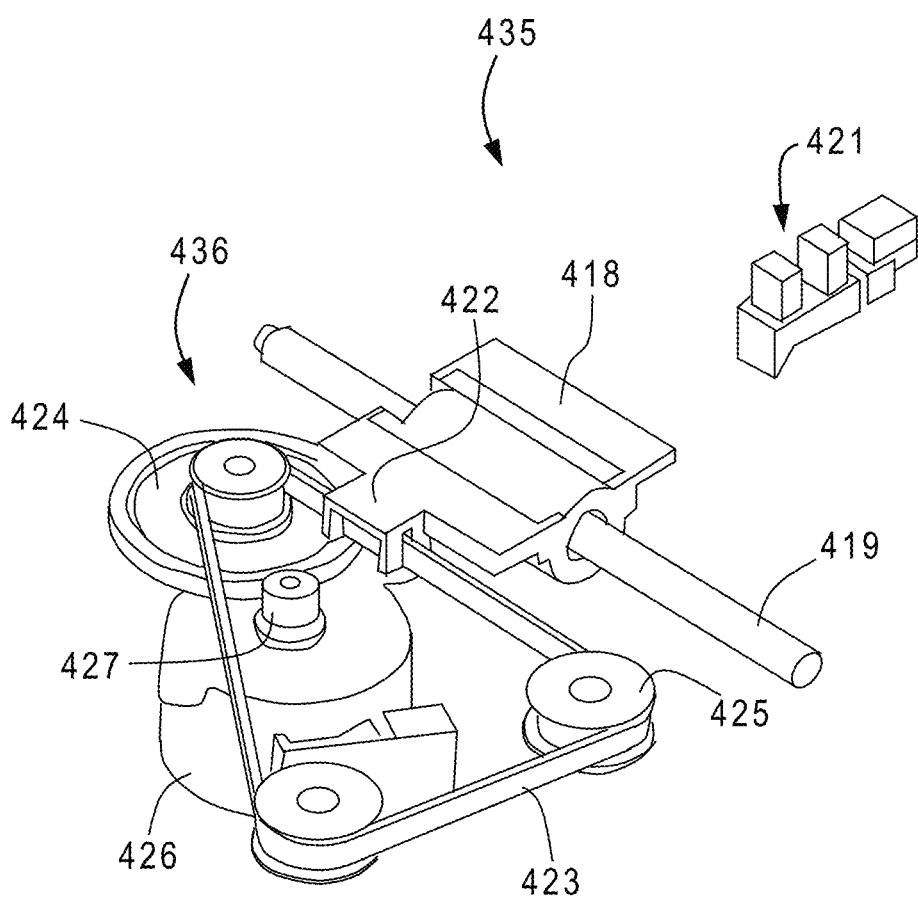
FIG. 12 is a perspective view illustrating the shading drive unit of the embodiment.

FIG. 11 is a cross-sectional view, when viewed in the sheet conveyance direction of the sheet S, illustrating a configuration of a shading drive unit 435 for moving the CIS 401 inside of the first surface reading unit 901. FIG. 12 is a perspective view illustrating the shading drive unit. The shading drive unit 435 is an example of a moving unit that supports the CIS 401 and enables the CIS 401 to move in the sub-scanning direction. To be noted, in the present embodiment, the sub-scanning direction is a moving direction of the CIS 401, and a direction orthogonal to a longitudinal direction (main scanning direction) of the CIS 401. In the present embodiment, the sub-scanning direction is perpendicular to the main scanning direction. The shading drive unit 435 includes a slide guide shaft 419 that is an example of a support shaft, a carriage 418 that is an example of a support member, and a drive mechanism 436. The slide guide shaft 419 extends in the sub-scanning direction, and is a shaft member that is fitted to the casing 407. The carriage 418 is disposed in a manner movable along the slide guide shaft 419, and supports the CIS 401. The drive mechanism 436 includes a motor 426, which is a drive source, and a timing belt 423, and moves the carriage 418 along the slide guide shaft 419.

As illustrated in FIG. 12, the carriage 418 that holds the CIS 401 is held by the slide guide shaft 419 in a manner slidable in an axial direction. A sensor flag 420 for detecting a position of the carriage 418 is disposed in a part of the carriage 418, and a photosensor 421 detects a passage and blockage of light by the sensor flag 420 in conjunction with the movement of the carriage 418. A stop position of the carriage 418 is controlled by a detection timing of the photosensor 421. A bearing portion 422 that holds a part of the timing belt 423 and is fitted to the slide guide shaft 419 is disposed in the carriage.

The timing belt 423 is wound around a gear pulley 424, and a drive force is transmitted to the timing belt 423. The timing belt 423 is stretched by idler pulleys 425. A motor gear 427 for drive transmission from the motor 426, which is the drive source, engages with a gear portion of the gear pulley 424. Therefore, by the drive of the motor 426, the CIS 401 slidingly moves along the slide guide shaft 419, and is enabled to perform reciprocating drive between the reading position and the shading position. By controlling the stop position based on the detection timing of the photosensor 421, the CIS 401 is enabled to stop at the stop position of the carriage 418.

Force Relationship during Movement of Carriage

Next, a relationship of forces that the first and second FFCs exert onto the carriage 418 during the movement of the carriage 418 will be described.

Comparative Example

Figure 14:
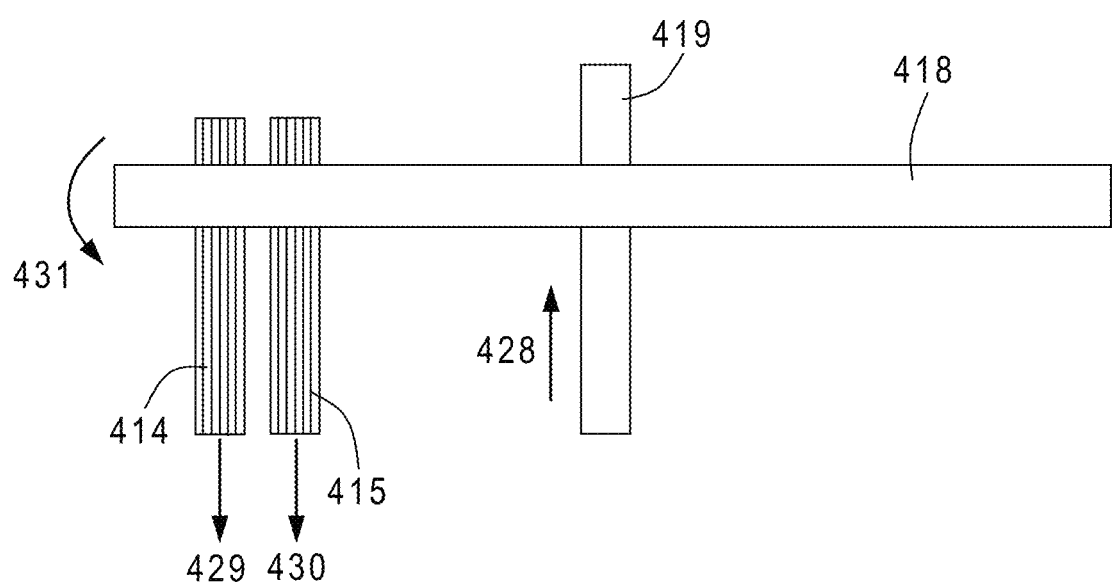
FIG. 14 is a plan view illustrating mounting positions of the first and second FFCs of a comparative example.

First, using FIG. 14, the movement of the carriage 418 of a comparative example, in which the first and second FFCs 414 and 415 are arranged on one side of the slide guide shaft 419 in a moving direction, will be described. FIG. 14 is a diagram explaining the relationship of the forces during the movement of the carriage 418 in a case where the first and second FFCs 414 and 415 are arranged on a left side in FIG. 14, and, in this diagram, the first surface reading unit 901 is viewed in an upper surface side (glass surface side). When the carriage 418 moves on the slide guide shaft 419 in the moving direction 428, the carriage 418 respectively receives loads of forces 429 and 430, which are either a pressing or pulling force, from the first and second FFCs 414 and 415. Since a rotational moment 431 applied to the carriage 418 is only in a counter-clockwise direction, there is a possibility that an inclination of the carriage 418 may occur. In particular, since, in the comparative example, the first and second FFCs include the bend portions 434 due to a positional relationship with the control substrate 413, the pulling forces 429 and 430 become larger in comparison with a case where the bend portions are not included, so that the inclination of the carriage 418 is likely to occur. Also, in a case where the moving direction 428 is reversed, the same applies.

Present Embodiment

Next, the movement of the carriage 418 of the present embodiment will be described. FIG. 13 is a diagram explaining the force relationship during the movement of the carriage 418, and, in this diagram, the first surface reading unit 901 is viewed in the upper surface side (glass surface side). When the carriage 418 moves on the slide guide shaft 419 in the moving direction 428, the carriage 418 respectively receives the loads of the forces 429 and 430, which are either a pressing force or pulling force, from the first and second FFCs 414 and 415. In response to this, so as to reduce the loads at that time, the first and second FFCs 414 and 415 are arranged separately on a left side and a right side of the diagram in FIG. 13 with respect to the slide guide shaft 419 as a center. By separately arranging the first and second FFCs 414 and 415 on the left side and the right side with respect to the slide guide shaft 419 as a center, it is possible to apply first and second rotational moments 432 and 433 around the slide guide shaft 419 as a center in directions to cancel each other. Also, in a case where the moving direction 428 is reversed, the same applies.

That is, in the main scanning direction perpendicular to the sub-scanning direction of the CIS 401, the first and second connecting portions 401a and 401b are arranged on opposite sides to each other across the shading drive unit 435. In other words, the first FFC 414 is held by the CIS 401 on one side with respect to the slide guide shaft 419 in the longitudinal direction of the CIS 401, and the second FFC 415 is held by the CIS 401 on the other side with respect to the slide guide shaft 419 in the longitudinal direction of the CIS 401. Further, the first rotational moment 432 is a rotational moment which the first FFC 414 generates during the movement of the shading drive unit 435 with respect to the shading drive unit 435 in a perpendicular direction, which is perpendicular to the main scanning direction and the sub-scanning direction, as a center line. The second rotational moment 433 is a rotational moment which the second FFC 415 generates during the movement of the shading drive unit 435 with respect to the shading drive unit 435 in the perpendicular direction as a center line. Further, the first and second connecting portions 401a and 401b are disposed in the positions in which the first and second rotational moments 432 and 433 act in the directions to cancel each other.

The center of gravity position of the carriage 418 is arranged in the same longitudinal position as the center of the slide guide shaft 419. That is, when viewed in the perpendicular direction, which is perpendicular to the main scanning direction and the sub-scanning direction, the slide guide shaft 419 is arranged so as to overlap the center of gravity position of the CIS 401. Distances from the slide guide shaft 419 to the first and second FFCs 414 and 415 respectively on the left and right sides are set to be an equal distance. That is, in the main scanning direction, the distance from the slide guide shaft 419 to the first connecting portion 401a is the same as the distance from the slide guide shaft 419 to the second connecting portion 401b. Thereby, it becomes possible to suppress the inclination of the carriage 418 as much as possible during the movement. That is, the first and second connecting portions 401a and 401b are arranged on the sides opposite to each other in the main scanning direction across the slide guide shaft 419.

In the present embodiment, the first and second FFCs 414 and 415 include the bend portions 434 due to the positional relationship with the control substrate 413. Therefore, the pulling forces 429 and 430 are larger than a case where the bend portions 434 are not included. However, even in such a case, it is possible to suppress the occurrence of the inclination of the carriage 418.

While the second surface reading unit 902 is installed in a vertically inverted manner with respect to the first surface reading unit 901, since a configuration is similar to the first surface reading unit 901, a function is also similar. While, in the present embodiment, the bend portions 434 bent 180 degrees are disposed, it is not limited to this, and, instead of the bend portions, it is acceptable to dispose curved portions curved less than 180 degrees.

As described above, according to the adjusting and inspecting unit 400 of the present embodiment, without causing a load imbalance from the first and second FFCs 414 and 415, it is possible to move the carriage 418 mounting the CIS 401. Thereby, it is possible to suppress the occurrence of the inclination of the carriage 418 and improve a positional repeatability of the CIS 401 in the reading position.

To be noted, while, in the embodiment described above, the first and second FFCs 414 and 415 are arranged in symmetrical positions with respect to the slide guide shaft 419 as a center, it is not limited to this. That is, it is acceptable as long as the first and second rotational moments 432 and 433 act in directions to cancel each other. Therefore, for example, it is acceptable to make the first FFC 414 thicker than the second FFC 415 by positioning the first FFC 414 nearer to the slide guide shaft 419 than the second FFC 415.

Further, while, in the embodiment described above, the first and second connecting portions 401a and 401b are disposed on the sides opposite to each other across the shading drive unit 435, it is not limited to this. For example, it is acceptable to dispose both the first and second connecting portions 401a and 401b on one side of the slide guide shaft 419 in the main scanning direction. In this case, the first FFC 414 is held by the CIS 401 on the one side with respect to the slide guide shaft 419 in the main scanning direction. Then, the second FFC 415 is stretched to reach the other side of the slide guide shaft 419 in the main scanning direction, and is held by the CIS 401. As described above, it is acceptable if the first and second FFCs 414 and 415 are held by the CIS 401 on the sides opposite to each other in the main scanning direction across the slide guide shaft 419. Further, while, in the present embodiment, the control substrate 413 includes the third and fourth connecting portions 413a and 413b, it is not limited to this. For example, it is acceptable to dispose each of the third and fourth connecting portions 413a and 413b to different substrates. Further, it is acceptable to arrange the control substrate 413 in a place different from the casing 407.

Further, in the embodiment described above, the single slide guide shaft 419 supports the CIS 401. However, the present embodiment can be applied to a configuration in which a plurality of slide guide shafts support the CIS 401. For example, in a case of a configuration in which the center and both ends of the CIS 401 each are supported by three slide guide shafts, the FFCs may be arranged on both sides of the slide guide shaft 419 that is nearest to the center of gravity position of the CIS 401.

Further, while a case in which the embodiment described above is applied to the adjusting and inspecting apparatus, serving as the image reading apparatus, is described, it is not limited to this, and, for example, it is acceptable to apply the present embodiment to image reading apparatuses such as an automatic document feeder (ADF) that conveys and automatically reads the document.

According to this disclosure, it is possible to suppress a decrease in the reading accuracy of the reading sensor.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-203553, filed Dec. 20, 2022 which is hereby incorporated by reference herein in its entirety.

What is claimed is:

1. An image reading apparatus comprising:
a conveyance roller configured to convey a sheet along a conveyance path;
a casing including a transparent member that is configured to form a part of the conveyance path;
a reading unit including a reading sensor configured to read an image of the sheet conveyed in the conveyance path through the transparent member, and accommodated in the casing;
a support shaft configured to support the reading unit in a manner of moving in a moving direction orthogonal to a longitudinal direction of the reading unit;
a first cable connected to a first connecting portion disposed in the reading unit, the first cable being held by the reading unit on one side in the longitudinal direction with respect to the support shaft;
a second cable connected to a second connecting portion disposed in the reading unit, the second cable being held by the reading unit on the other side in the longitudinal direction with respect to the support shaft; and
a control substrate including a third connecting portion, to which the first cable is connected, and a fourth connecting portion to which the second cable is connected, and configured to control the reading unit,
wherein the control substrate is disposed outside of the casing.

2. The image reading apparatus according to claim 1, further comprising:
a support member configured to move along the support shaft and support the reading unit; and
a drive mechanism configured to move the support member along the support shaft.

3. The image reading apparatus according to claim 1, wherein the first connecting portion is disposed on the one side in the longitudinal direction with respect to the support shaft, and
wherein the second connecting portion is disposed on the other side in the longitudinal direction with respect to the support shaft.

4. The image reading apparatus according to claim 3, wherein, in the longitudinal direction, a distance from the support shaft to the first connecting portion is a same as a distance from the support shaft to the second connecting portion.

5. The image reading apparatus according to claim 1, wherein, when viewed in a perpendicular direction that is perpendicular to the longitudinal direction and the moving direction, the support shaft is disposed to overlap a center of gravity position of the reading unit.

6. The image reading apparatus according to claim 1, wherein the first cable and the second cable have flexibility, and deform while curving in conjunction with a movement of the reading unit.

7. The image reading apparatus according to claim 1, wherein the first cable and the second cable are flexible flat cables.

8. The image reading apparatus according to claim 1, wherein the first cable and the second cable are configured to transmit an image signal from the reading sensor to the control substrate.

9. The image reading apparatus according to claim 1, further comprising:
a facing member arranged in a manner of facing the transparent member in a reading position of the reading unit;
a sheet guide member disposed in a manner of facing a surface on a side of the conveyance path of the transparent member and configured to guide the sheet conveyed by the conveyance roller into a gap between the facing member and the transparent member; and
a white reference board disposed on a surface of the sheet guide member on a side opposite to the conveyance path, and configured to be used for shading correction of the reading unit.

10. An image forming system comprising:
an image forming apparatus including an image forming unit configured to form an image on a sheet; and
an image reading apparatus configured to read the image of the sheet on which the image has been formed in the image forming unit,
wherein the image reading apparatus includes:
a conveyance roller including an inlet roller configured to receive the sheet from the image forming apparatus and configured to convey the sheet along a conveyance path;
a casing including a transparent member that is configured to form a part of the conveyance path;
a reading unit including a reading sensor configured to read an image of the sheet conveyed in the conveyance path through the transparent member, and accommodated in the casing;
a support shaft configured to support the reading unit in a manner of moving in a moving direction orthogonal to a longitudinal direction of the reading unit;
a first cable connected to a first connecting portion disposed in the reading unit, the first cable being held by the reading unit on one side in the longitudinal direction with respect to the support shaft;
a second cable connected to a second connecting portion disposed in the reading unit, the second cable being held by the reading unit on the other side in the longitudinal direction with respect to the support shaft; and
a control substrate including a third connecting portion, to which the first cable is connected, and a fourth connecting portion to which the second cable is connected, and configured to control the reading unit,
wherein the control substrate is disposed outside of the casing.

* * * * *